United States Patent Office

2,913,423
Patented Nov. 17, 1959

2,913,423

PROCESS FOR THE PREPARATION OF NITRO-HALO POLYMERS

Gustave B. Bachman, West Lafayette, Ind., and Ted J. Logan, Cincinnati, Ohio, assignors to Purdue Research Foundation, Lafayette, Ind., a corporation of Indiana No Drawing. Application February 14, 1958
Serial No. 715,203

11 Claims. (Cl. 260—2)

Our invention relates to a process for the preparation of nitrohalo polymers, and more particularly our process relates to the preparation of unbranched polymers wherein the nitro and halo substituents are geminal by reacting a 1,2-dihalogenated-1-nitroethane with a base.

Previously, the nitrohalo polymers prepared by the process of our invention could only be prepared by the process of Wilkendorf and Trenel, Ber. 57B, 306–9 (1924), who reacted 2-chloro-2-nitroethyl nitrate with sodium bicarbonate to form a nitrochloro polymer.

We have now discovered that we can prepare polymers having the following structural formula

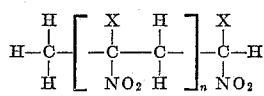

where X is halogen, and $n$ is an integer, by reacting a 1,2-dihalogenated-1-nitroethane having the structural formula

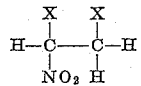

where X is halogen, with a base.

Among the 1,2-dihalogenated 1-nitroethanes which are operative in our process are 1,2-difluoro-1-nitroethane, 1,2-dichloro-1-nitroethane, 1,2-dibromo-1-nitroethane, 1,2-diiodo-1-nitroethane, 2-bromo-1-chloro-1-nitroethane, 1-bromo-2-iodo-1-nitroethane, etc.

The 1,2-dihalo-1-nitroethane used in our process can be prepared in a number of ways, for example by the addition of halogens to nitroolefins (Wieland and Sakellarios, Ber., vol. 52B, p. 903 (13 C.A. 2874)) and (B. Askenasy and V. Meyer, Ber., vol. 25, 1708 (1892)), the condensation of formaldehyde with halonitromethanes, followed by halogenation of the alcohol with $PCl_5$ (W. Steinhoff and M. Kuhnel, Ber., 75B, 1329–30 (1942)), the vapor phase halonitration of vinyl halides (Ph.D. thesis of Ted J. Logan, Purdue University (1958)), etc.

The bases which can be utilized in our process may be organic or inorganic. We found alkali metal hydroxides, such as potassium or sodium hydroxide; alkaline earth metal hydroxides, such as barium or calcium hydroxide; various carbonates, such as calcium carbonate, sodium bicarbonate, etc.; organic amines, such as the lutidines; etc. to be useful in our process. We prefer to use carbonates as the basic materials utilized in our process due to the fact that they do not interfere with polymer recovery and they allow the reaction to go to completion.

The process of our invention is operative at room temperature and pressure. It is preferred to maintain the reaction temperatures at below about 20° C. and in processes where bromo and iodo nitroethanes or where organic amines are utilized, it is preferable to maintain the temperature at least as low as 0° C. There is little polymer formation if the reaction is carried out at a temperature much in excess of about 20° C. We have found that we can obtain an 86% polymer recovery with a 1:1 molar ratio of dihalogenated nitroethane to basic material during reaction periods of several hours.

We have found that the polymers prepared by the process of our invention are moldable plastics of greatly reduced inflammability having the same general utility as the vinyl polymers. The plastics of our invention are easily deposited on cellulosic fabrics or paper which have been treated with a 50% base solution for several hours by dissolving the polymer in a 50% ethanol solution, pure 1,2-dichloro-1-nitroethane, etc., to the extent of about 10% by weight of polymer to solution. The polymer deposits on the base treated textile as the textile is passed through the polymer solution. The textile or paper is then dried and requires no further treatment.

The following examples further illustrate our invention, and it is not intended that the invention be restricted to the procedures, proportions, or compounds described therein, but rather it is intended for all equivalents obvious to those skilled in the art be included within the scope of our invention.

Example I

To prepare a nitrochloro polymer 0.05 mole of sodium bicarbonate was added to 100 ml. of water and 0.05 mole of 1.2-dichloro-1-nitroethane then slowly added to the bicarbonate solution. Carbon dioxide began to bubble off immediately and the water became yellow, then red. The bottom, organic layer slowly disappeared and the polymer appeared in the water layer. The mixture was allowed to stand overnight and the polymer was removed from the reaction mixture by filtration. The polymer was washed eight times with dilute hydrochloric acid. This treatment changed the red coloration of the polymer to a cream color. The solid was then redissolved in hot glacial acetic acid and reprecipitated with water. On heating liquid appears on the polymer surface at 118° C.; it forms a clear yellow liquid at 187° C. and becomes black at 218° C. An 86% yield of the polymer was obtained.

Example II

The nitrochloro polymer was also prepared as follows: A solution of 0.1 mole of 1,2-dichloro-1-nitroethane to 100 ml. of benzene was prepared. After cooling the solution to 0° C., 0.1 mole of 2,6-lutidine was added to the reaction mixture a drop at a time over a period of 1 hour and 25 minutes. From the resulting red liquid reaction mixture, 27.5 grams of solid was recovered. This solid was washed with water to yield 6.4 grams of the geminal chloronitro polymer. This amounted to a yield of 60%, based on the weight of the 1,2-dichloro-1-nitroethane.

Example III

The following table sets out various nitrohalo polymers which can be prepared by the procedure of Example I wherein the described base is reacted with the described dihalonitroethane.

| Polymer | Base | 1,2-dihalo-1-nitroalkane |
|---|---|---|
| Bromonitropolymer | KOH | 1,2-dibromo-1-nitroethane. |
| Do | $KHCO_3$ | 1-bromo-2-iodo-1-nitroethane. |
| Fluoronitropolymer | $NaHCO_3$ | 1,2-difluoro-1-nitroethane. |
| Iodonitropolymer | $NaHCO_3$ | 1,2-diiodo-1-nitroethane. |
| Chloronitropolymer | $N(CH_3)_3$ | 1-chloro-2-bromo-1-nitroethane. |

In general, we prefer to carry out our reaction under weakly basic rather than strongly basic conditions as the latter tend to destroy the desired end products. As the reaction temperature is increased the activity of the base is increased.

Now having described our invention what we claim is:
1. A process for the preparation of geminal nitrohalo polymers which comprises reacting under weakly basic conditions at below about 20° C. and in approximately equimolar proportions a 1,2-dihalo-1-nitroethane with a base, and recovering the polymers thereby formed.

2. A process for the preparation of nitrohalo polymers which comprises reacting under weakly basic conditions at below about 20° C. and in approximately equimolar proportions a 1,2-dihalo-1-nitroethane with an inorganic base, and recovering the polymers thereby formed.

3. The process of claim 2 wherein the inorganic base is an inorganic carbonate.

4. The process of claim 2 wherein the inorganic base is an inorganic bicarbonate.

5. The process of claim 2 wherein the inorganic base is an alkali metal hydroxide.

6. The process of claim 2 wherein the inorganic base is an alkaline earth metal hydroxide.

7. The process for the preparation of nitrohalo polymers which comprises reacting a 1,2-dihalo-1-nitroethane with a tertiary amine at below about 20° C. and in approximately equimolecular proportions and recovering the polymers thereby formed.

8. A process for the production of nitrofluoro polymers which comprises reacting a 1-fluoro-2-halo-1-nitroethane with an inorganic base at below about 20° C. and in approximately equimolecular proportions and recovering the polymers thereby formed.

9. A process for the preparation of nitrochloropolymers which comprises reacting a 1-chloro-2-halo-1-nitroethane with an inorganic base at below about 20° C. and in approximately equimolecular proportions and recovering the polymers thereby formed.

10. A process for the production of nitrobromo polymers which comprises reacting a 1-bromo-2-halo-1-nitroethane with an inorganic base at below about 20° C. and in approximately equimolecular proportions and recovering the polymers thereby formed.

11. A process for the production of nitroiodo polymers which comprises reacting a 1-iodo-2-halo-1-nitroethane with an inorganic base at below about 20° C. and in approximately equimolecular proportions and recovering the polymers thereby formed.

References Cited in the file of this patent

Wieland et al.: Ber., vol. 52B, page 903.